United States Patent [19]

Pittsinger

[11] Patent Number: 4,921,001

[45] Date of Patent: May 1, 1990

[54] APPARATUS AND METHOD FOR ADAPTING SENSORS TO AN IRRIGATION CONTROLLER

[75] Inventor: Stephen D. Pittsinger, Plano, Tex.

[73] Assignee: Tri-Phase, Inc., Dallas, Tex.

[21] Appl. No.: 354,891

[22] Filed: May 22, 1989

[51] Int. Cl.⁵ .............................................. F16K 17/36
[52] U.S. Cl. ............................. 137/78.2; 137/624.12; 239/70; 307/112; 361/178
[58] Field of Search ............. 137/624.11, 78.3, 624.12, 137/78.2; 361/178; 307/112; 239/70

[56] References Cited

U.S. PATENT DOCUMENTS

| 3,279,379 | 10/1966 | Klyce | 361/178 |
| 3,777,976 | 12/1973 | Milovancevic | 137/78.3 |
| 3,991,939 | 11/1976 | Maclay | 239/70 |
| 4,246,574 | 1/1981 | Sanner | 137/78.3 |
| 4,256,133 | 3/1981 | Coward et al. | 137/78.3 |

Primary Examiner—A. Michael Chambers
Attorney, Agent, or Firm—Gregory W. Carr

[57] ABSTRACT

There is provided a method and an apparatus for adapting a conventional freeze and rain sensors to be used with a water irrigation system in which a water valve is retracted by a latching solenoid.

2 Claims, 1 Drawing Sheet

APPARATUS AND METHOD FOR ADAPTING SENSORS TO AN IRRIGATION CONTROLLER

FIELD OF THE INVENTION

This invention relates generally to water irrigation systems, and more particularly to adapting rain and freeze sensors to battery-operated controllers for water irrigation systems.

BACKGROUND OF THE INVENTION

Automated and semi-automated water irrigation systems are usually operated by a programmable timer/controller to open and close water valves through which the water passes to the irrigation system. Such timer/controllers are capable of opening and closing a number of water valves at pre-set times and for selected durations to water lawns and gardens. Each water valve typically controls the supply of water to a number of sprinkler heads that irrigate a section of the lawn and garden area to be irrigated. Normally, a single irrigation system will include a number of such water valves that are operated by the timer/controller to irrigate each section of the overall system on a desired schedule. In the past, the programmable timer/controller has been powered by a 120 volt alternating current (AC) power source.

The water valves are opened and closed by means of a diaphragm, controlled by the actuator of a solenoid. To open the valve, the programmable timer/controller supplies current to the solenoid, causing the actuator to pop up and open the valve. The actuator is spring-loaded so that, when the solenoid is not supplied with current, it returns to its original position and causes the valve to close. An alternating current source is preferred because it conveniently provides the continuous supply of current required to keep the section valves open during irrigation.

Use of such AC timer/controllers in many remote areas is, however, extremely costly and inconvenient because, in such areas, an AC power line usually must also be installed. Typical of such remote areas are medians of roadways, farms, parks and the like. To meet the need for a programmable timer/controller usable in remote areas without a 120 volt AC power source, IRRI-TROL Corporation, located at 27940 Beale Court, Valencia, Calif. 91355, developed two models of battery-operated controllers. The first model, identified by the trademark "CQ/DC," was later replaced by a successor battery-operated controller, identified by the trademark "IBOC." Power was supplied to both models by a 24 volt DC power source installed at the remote location. The 24 volt DC power source usually comprises two 12 volt batteries connected in series.

The battery-operated controllers could not be used with the spring-loaded solenoids of the AC powered controllers, because such solenoids require a continuous current supply when actuated. Such a current demand would quickly consume the supply of the battery power. Thus, valves of systems utilizing the battery-operated controllers are actuated by a latching solenoid, rather than the spring-loaded solenoids.

The latching solenoid eliminated the need for a continuous current to control the position of the section valves. When a positive 24 volt pulse of relatively short duration is supplied by the CQ/DC or IBOC controllers, the solenoid actuator retracts and latches, thereby opening the water valve. The water valve thereafter remains open without any additional current being supplied by the controller. Conversely, a negative 24 volt pulse from the controller unlatches the actuator and permits the valve to be closed.

Use of the IBOC and CQ/DC controllers in combination with latching solenoids unexpectedly resulted in one or more section valves remaining open after the watering cycle had ended, thereby allowing watering to continue indefinitely. This caused damage from flooding and freezing, in addition to wasting water. This malfunction occurs in systems which utilize, as is typical, rain and/or freeze sensors, or any other climatic condition sensors, to prevent watering when it rains or when the temperature is below freezing. Freeze sensors are desirable, for example, if the water sprinkler system is installed in a roadway median, to prevent the system from operating in freezing conditions that would form hazardous ice on the adjacent roadway. Rain sensors are desirable to avoid over-watering and to save water. Such sensors disable the control circuit between the controller and the latching solenoids, to prevent the valves from being opened at the start of a planned watering cycle.

Upon close examination of these failures, it was found that the rain or freeze sensors had activated when one or more section water valves were open, thereby disabling the control circuit to each valve. Hence, the controller could not shut the water valve. This exacerbated the very problems of freezing, flooding and water waste that the sensors are designed to avoid. Because the only commercially available rain and freeze sensors employ this method of opening the control circuit, there is a great need for an apparatus and method for avoiding disablement of the control circuit by the sensors in the midst of a watering cycle.

SUMMARY OF THE INVENTION

This invention solves the aforementioned problem with a method and apparatus that can easily be implemented with existing IBOC and CQ/DC controllers having rain and/or freeze sensors. Through the method, such sensors are able to prevent activation of the latching solenoids to open the section valves when unacceptable conditions (rain or freeze) are present. Conversely, however, the method permits closure of the valve by unlatching the solenoid at the end of the cycle regardless of whether rain or freezing conditions are present. The apparatus includes a diode connected both in series with the control circuit for the latching solenoid and in parallel with one or more rain or freeze sensors incorporated in the system. The diode is orientated such that it conducts the current of a negative pulse from the controller for closing an associated section valve, thereby overriding the sensor. The diode will not conduct current of a positive pulse to open the valve if the associated sensor has been activated by rain or freeze. Also included is a switch to enable the diode, and thereby the rain or freeze sensor, to be easily bypassed when, for instance, the sensor is malfunctioning.

DETAILED DESCRIPTION OF THE DRAWINGS

Figure 1:
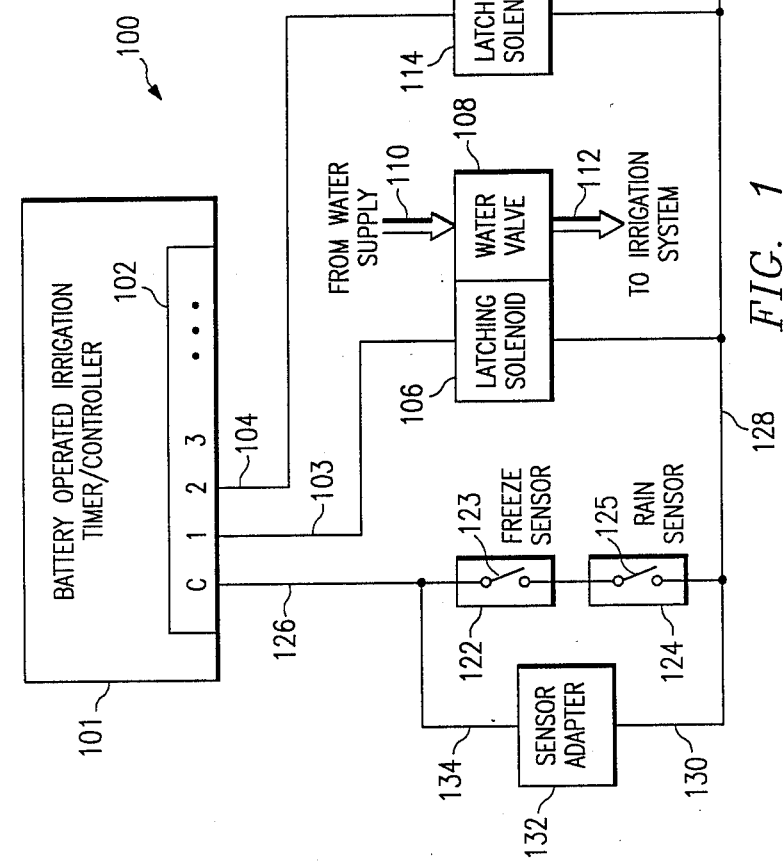
FIG. 1 is a schematic illustration showing a battery-powered irrigation system incorporating the invention.

Shown in FIG. 1 is a battery-powered irrigation control system 100 incorporating a timer/controller 101 such as the IBOC or CQ/DC controllers of IRRITROL Corporation. The timer/controller 101 includes a bank of terminals 102, each for controlling a separate water valve (eg. valves 108, 116, etc.). The timer/controller 101 also includes a common terminal C, which acts as a ground. Each terminal provides a control signal from the timer/controller 101 to an associated latching solenoid (identified as 106, 114, etc.) of a particular section of the area serviced by the system 100. The timer/controller 101 can be programmed to water each section at a preselected day and time, and for a preselected duration.

Watering of the section associated with terminal 1, for example, is initiated by the timer/controller 101 supplying a positive 24 volt pulse, lasting approximately 215 milliseconds, via a line 103 to an associated latching solenoid 106. The positive 24 volt pulse energizes a coil of the latching solenoid 106, causing the valve actuator of the latching solenoid to retract. Latching solenoid 106 is coupled to a water valve 108, so that when the actuator retracts in response to the electrically positive pulse, the water valve 108 opens. Water valve 108 is a conventional diaphragm variety, well-known in the art, which has a receptacle (not shown) to which the latching solenoid 106 is secured. When the water valve 108 opens, water from a pipe 110 is supplied to the section to be irrigated through a pipe 112.

Watering of the section serviced by terminal 1 is stopped at the end of the preprogrammed watering period by the timer/controller 101 issuing to the latching solenoid 106 on line 102 a negative 24 volt pulse, lasting approximately 215 milliseconds. The negative 24 volt pulse unlatches the actuator of the latching solenoid 106. The actuator is then extended by a spring, to close the water valve 108.

Typically, the timer/controller 101 is programmed to begin watering the section associated with terminal 2 once watering of the section associated with terminal 1 is concluded. To do so, timer/controller 101 operates a latching solenoid 114 in the same manner as solenoid 106 is operated, with the exception that the control pulses are issued on line 104. The latching solenoid 114, in turn, opens and closes an associated water valve 116 in the manner described previously with respect to the latching solenoid 106. The water valve 116 controls the flow of water from a pipe 118 to the section via a pipe 120.

All of the latching solenoids are connected to a common line 128. The line 128 connects the latching solenoids 106 and 114 in series with a freeze sensor 122 and a rain sensor 124. A line 126 completes the control circuit for each latching solenoid by connecting the sensors 122 and 124 to the common terminal C of timer/controller 101. When, for example, the rain sensor 124 senses rain, an associated switch 125 is opened, thereby disabling the control circuit for the solenoids 106 and 114. Similarly, when the freeze sensor 122 detects freezing conditions, it opens an associated switch 123, also disabling the control circuit for the solenoids 106 and 114. Thus, the sensors 122 and 124 are capable of disrupting electrical communication between the timer/controller 101 and the latching solenoids 106 and 114 when rain or freezing conditions occur.

The sensor adapter 132 is connected in parallel across freeze and rain sensors 122 and 124, via a line 130 and a line 134. The sensor adapter 132 allows transmittal of a negative pulse through the control circuit (comprising the lines 103 or 104 and the lines 128 and 126) to close the water valves 108 and 116 in the event either or both of the sensors 122 and 124 are open in the midst of a watering cycle. The sensor adapter 132 also allows selective bypass of the freeze and rain sensors 122 and 124, as desired.

Figure 3:
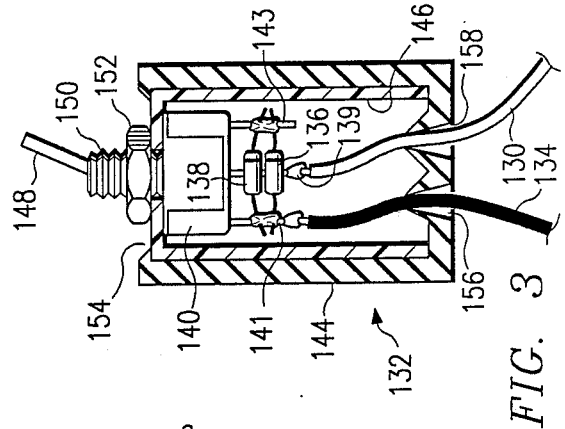
FIG. 3 is a sectional view of a sensor adapter incorporating the invention.
Figure 2:
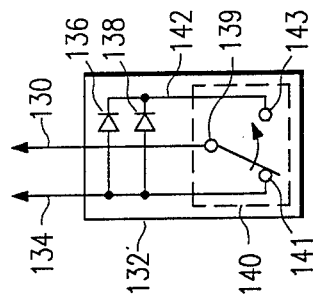
FIG. 2 is an electrical schematic of a sensor adapter incorporating the invention.

Referring to FIGS. 2 and 3, the line 130 is connected to the common terminal of a single-pole, double-throw switch 140. The line 134, which is connected to the common terminal C of timer/controller 101 through line 126, is directly connected to a terminal 141 of the switch 140. The line 134 is also coupled to the other terminal 143 of the switch 140 through a pair of diodes 136 and 138 and a line 142. The diodes 136 and 138 are connected in parallel between lines 134 and 142. The diodes 136 and 138 are 1N4148 diodes, with peak inverse ratings of 75 volts.

Referring to FIG. 3, in particular, there is shown a mechanical section of the sensor adapter 132. The switch 140 is a single-pole, double throw switch operated by a toggle 148. The leads of the diodes 136 and 138 are directly soldered in parallel to terminals 141 and 143. Directly soldering of the diodes to the terminals of the switch 140 firmly secures the diodes within the housings 144 and 146, and prevents them from being disturbed by someone pulling on the lines 130 and 134. The housings 144 and 146 are manufactured from a molded, durable plastic. The line 134 is soldered to the terminal 141. The line 130 is soldered to terminal 139. The sensor adapter 132 is rugged, self-contained and easily added to the IBOC and CQ/DC controllers.

To assemble the sensor adapter 132, housing 144 is secured to the housing 146 by inserting the threaded collar 150 and the toggle 148 through a circular hole in the closed end of the housing 146. The switch is firmly secured by screwing a nut 152 onto the collar 150. The housing 146 is inserted into the open end of the housing 144, with the toggle 148 extending through the open end of housing 144. The housing 146 fits snugly into the housing 144 and is secured there by a flange 154. The lines 130 and 134 extend through holes 158 and 156, respectively, in the closed end of the housing 144.

In a first position, the switch 140 connects line 130 directly to line 134, directly connecting the latching solenoids 106 and 114 to the common terminal C of timer/controller 101 and bypassing the sensors 122 and 124. In this first position, the freeze and rain sensors 122 and 124 cannot open the latching control circuit formed by lines 103 or 104, and lines 128, 130, 134 and 126.

When the switch 140 is in the second position, making contact between terminals 139 and 143, line 130 is connected to line 134 through the pair of parallel diodes 136 and 138. In the second position, the control circuit for latching solenoids 106 and 114 is closed by the diodes only with respect to negative control pulses issued from the timer/controller 101 to close the valves 108 and 116. However, the control circuit remains open for positive pulses that would open the valves.

Therefore, when the switch 140 is in either position, the sensor adapter 132 permits the timer/controller 101 to unlatch latching solenoids 106 and 114 by issuing a negative pulse from the associated terminal. When the switch 140 is in the first position, the sensor adapter 132 provides an electrical avenue to actuate the solenoids 106 and 114 and open their associated valves, even if the sensors 122 and 124 are triggered. Only when the switch 140 is in the second position can the freeze sensor 122 and the rain sensor 124 operate to disable the latching of the latching solenoid.

The self-contained sensor adapter 132 can be installed on existing IBOC and CQ/DC controllers by connecting line 134 to the common terminal C of the timer/controller 101, and connecting line 130 to the common line 128 of the latching solenoids.

Only the preferred embodiment of the invention has been described. It should be understood that the invention is not limited to the embodiments disclosed, but is intended to embrace any alternatives, modifications, rearrangements, or substitutions of parts or elements as fall within the spirit and scope of the invention.

What is claimed is:

1. A sensor adapter for use with a water irrigation controller having one or more climatic sensors comprising:
    a housing;
    a single-pole, double-throw switch enclosed in the housing and having a first and a second input lead and an output lead;
    means for conducting current in two directions coupled to the first input lead;
    two diodes with leads, the diodes being enclosed in the housing, one lead from each diode being soldered to the first input lead and the remaining lead of each diode being soldered to the second input lead, such that the diodes are oriented in the same direction and connected in parallel; and
    a toggle coupled to the switch and protruding from the housing to enable manual actuation of the switch.

2. A sensor adapter in combination with the water irrigation system comprising:
    a water irrigation controller;
    a latching solenoid having an input and an output, the input being coupled to the controller;
    a climatic condition sensor having a first and a second lead, the first lead being coupled to the controller and the second lead being coupled to the output of the latching solenoid, the climatic sensor opening a current path between the first and second leads when a predetermined climatic condition is sensed; and
    a sensor adapter coupled between the controller and the output of the latching solenoid and in parallel with the climatic condition sensor, such that the controller is able to unlatch the latching solenoid when the climatic sensor opens the current path, the sensor adapter including a housing, switch means enclosed within the housing and having a first and a second input lead and an output lead, means for conducting current in two directions coupled to the first input lead, and first and second diodes enclosed within the housing coupled in parallel and in the same direction between the first and second inputs.

* * * * *